(12) United States Patent
Gao et al.

(10) Patent No.: US 11,709,467 B2
(45) Date of Patent: Jul. 25, 2023

(54) TIME OPTIMAL SPEED PLANNING METHOD AND SYSTEM BASED ON CONSTRAINT CLASSIFICATION

(71) Applicant: GUANGDONG UNIVERSITY OF TECHNOLOGY, Guangzhou (CN)

(72) Inventors: Jian Gao, Guangzhou (CN); Guixin Zhang, Guangzhou (CN); Lanyu Zhang, Guangzhou (CN); Haixiang Deng, Guangzhou (CN); Yun Chen, Guangzhou (CN); Yunbo He, Guangzhou (CN); Xin Chen, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 17/991,936

(22) Filed: Nov. 22, 2022

(65) Prior Publication Data
US 2023/0185262 A1 Jun. 15, 2023

(30) Foreign Application Priority Data
Dec. 10, 2021 (CN) .......................... 202111505094.4

(51) Int. Cl.
*G05B 19/04* (2006.01)
*G06F 17/16* (2006.01)

(52) U.S. Cl.
CPC ........... *G05B 19/041* (2013.01); *G06F 17/16* (2013.01)

(58) Field of Classification Search
CPC ............................... G05B 19/041; G06F 17/16
See application file for complete search history.

(56) References Cited

U.S. PATENT DOCUMENTS

| 2002/0099756 A1* | 7/2002 | Catthoor | G06F 30/30 |
| | | | 718/102 |
| 2003/0061004 A1* | 3/2003 | Discenzo | G06Q 10/06 |
| | | | 702/182 |

(Continued)

FOREIGN PATENT DOCUMENTS

| CN | 102981456 A | 3/2013 |
| CN | 109188915 A | 1/2019 |

(Continued)

OTHER PUBLICATIONS

Fang Chenxi et al., "Convex optimization approach in time-optimal feed planning for CNC", Department of Mechanical Engineering, Tsinghua University et al., vol. 21, No. 1, Jan. 2015.

(Continued)

*Primary Examiner* — Tuan C Dao

(57) ABSTRACT

A time optimal speed planning method and system based on constraint classification. The method comprises: reading path information and carrying out curve fitting to obtain a path curve; sampling the path curve, and considering static constraint to obtain a static upper bound value of a speed curve; considering dynamic constraint, and combining the static upper bound value of the speed curve to construct a time optimal speed model; carrying out convex transformation on the time optimal speed model to obtain a convex model; and solving the convex model based on a quadratic sequence planning method to obtain a final speed curve. The system comprises: a path curve module, a static constraint module, a dynamic constraint module, a model transformation module and a solving module.

4 Claims, 3 Drawing Sheets

(56) References Cited

U.S. PATENT DOCUMENTS

| | | | |
|---|---|---|---|
| 2004/0006502 A1* | 1/2004 | Masiello | G06Q 10/0631 |
| | | | 703/2 |
| 2005/0111621 A1* | 5/2005 | Riker | G16H 20/40 |
| | | | 378/65 |
| 2010/0204808 A1* | 8/2010 | Thiele | G05B 17/02 |
| | | | 700/30 |
| 2010/0256856 A1* | 10/2010 | Taguchi | B60L 15/2045 |
| | | | 903/903 |
| 2012/0245756 A1* | 9/2012 | Cooprider | B60W 50/14 |
| | | | 701/1 |
| 2014/0162219 A1* | 6/2014 | Stankoulov | G09B 19/167 |
| | | | 434/65 |
| 2015/0369214 A1* | 12/2015 | Herbsleb | F03D 7/022 |
| | | | 416/61 |
| 2020/0004228 A1 | 1/2020 | Jia et al. | |

FOREIGN PATENT DOCUMENTS

| | | | |
|---|---|---|---|
| CN | 109491389 A | 3/2019 | |
| CN | 110031817 A | 7/2019 | |
| CN | 110196590 A | 9/2019 | |
| CN | 110417015 A | 11/2019 | |
| CN | 113189939 A | 7/2021 | |

OTHER PUBLICATIONS

Wang Qi et al., "Smoothing for optimal feed rate of CNC machining time", College of Mechanical and Electrical Engineering, China Jiliang University, vol. 38, No. 1, Jan. 31, 2021.

\* cited by examiner

TIME OPTIMAL SPEED PLANNING METHOD AND SYSTEM BASED ON CONSTRAINT CLASSIFICATION

CROSS REFERENCE TO RELATED APPLICATIONS

This application claims foreign priority of Chinese Patent Application No. 202111505094.4, filed on Dec. 10, 2021 in the China National Intellectual Property Administration, the disclosures of all of which are hereby incorporated by reference.

TECHNICAL FIELD

The present invention relates to the field of precision motion control, and particularly to a time optimal speed planning method and system based on constraint classification.

BACKGROUND

With the development of power source, aerospace and other technologies, the requirements for machining quality and machining efficiency of parts with a complex curved surface are getting higher and higher. In order to ensure the machining efficiency, it is necessary to plan a machining time optimal speed curve according to a path to be taken, and there are two speed planning methods, comprising an S-shaped planning method and an optimal planning method, wherein a speed curve planned by the S-shaped planning method in the case of complex path cannot achieve time optimum, and over scaling often occurs in places where a path curvature is changeable and changes greatly or other constraints change greatly in the optimal planning method, so that the stability of constraint solution is poor.

SUMMARY

In order to solve the technical problems above, the present invention aims to provide a time optimal speed planning method based on constraint classification, in which a time optimal speed curve can still be planned under the condition of complex path, more types of constraints can be considered, and the condition of excessive scaling cannot occur.

A first technical solution used in the present invention is: a time optimal speed planning method based on constraint classification, which comprises the following steps of:

reading path information and carrying out curve fitting to obtain a path curve;

sampling the path curve, and considering static constraint to obtain a static upper bound value of a speed curve;

considering dynamic constraint, and combining the static upper bound value of the speed curve to construct a time optimal speed model;

carrying out convex transformation on the time optimal speed model to obtain a convex model; and solving the convex model based on a quadratic sequence planning method to obtain a final speed curve.

Further, a formula of the curve fitting is expressed as follows:

$$C(u) = \frac{\sum_{i=0}^{n} N_{i,p}(u) w_i P_i}{\sum_{i=0}^{n} N_{i,p}(u) w_i}, u_1 \le u \le u_{n+p+1},$$

wherein C(u) represents the path curve, $P_i$ represents a control point, $w_i$ represents a weight coefficient corresponding to the control point, $N_{i,p}$ represents an $i^{th}$ p-order function, and u represents a spline parameter variable.

Further, the step of considering the dynamic constraint, and combining the static upper bound value of the speed curve to construct the time optimal speed model, specifically comprises:

substituting the static upper bound value of the speed curve into a dynamic constraint equation set point by point, and constructing an initial model with time optimum as the objective function; and transforming the initial model according to a feed speed and the static upper bound value to obtain the time optimal speed model.

Further, a formula of the time optimal speed model is expressed as follows:

$$\min O = \sum_{i=1}^{n}(f_{up,i} - F_i)$$

$$s.t. \begin{cases} |A_i(s)| \le a_{t,max} \\ |J_i(s)| \le j_{t,max} \\ |A_{\wedge,i}(s)| \le a_{\wedge,max} \\ |J_{\wedge,i}(s)| \le j_{\wedge,max} \\ f_1 = 0, f_2 = 10, f_{n-1} = 10, f_n = 0 \end{cases}$$

$$i = 3, 4, \ldots, n-2,$$

wherein $f_{up,i}$ represents a maximum speed value at an $i^{th}$ sampling point, $F_i$ represents an optimal speed value at the $i^{th}$ sampling point, $A_i(s)$ and $J_i(s)$ represent an acceleration and a jerk at the $i^{th}$ sampling point in a feed direction, $A_{\wedge,i}(s)$ and $J_{\wedge,i}(s)$ represent an acceleration and a jerk at the $i^{th}$ sampling point in a $\wedge$ axis direction, $a_{t,max}$ and $j_{t,max}$ respectively represent a maximum acceleration and a maximum jerk in a tangent direction, and $a_{\wedge,max}$ and $j_{\wedge,max}$ represent a maximum acceleration and a maximum jerk in the $\wedge$ axis direction.

Further, the step of carrying out the convex transformation on the time optimal speed model to obtain the convex model, specifically comprises:

transforming an objective function of the time optimal speed model into a matrix form to obtain an objective function of the matrix form;

transforming a constraint condition into a matrix form through matrix decomposition and a preset scaling function to obtain a constraint condition of the matrix form; and obtaining the convex model according to the objective function of the matrix form and the constraint condition of the matrix form.

Further, a formula of the convex model is expressed as follows:

$$\min O = F^T EF - F_{up}^T F_{up}$$

$$s.t. \begin{cases} \frac{1}{2} F^T P_i^+ F + \frac{1}{2} F_{up}^T \gamma (P_i^-) F + q_i^T F + c \le 0 \\ (E_1 + E_2 + E_{n-1} + E_n) F = b \end{cases}$$

$$i = 3, 4, \ldots, n-2,$$

wherein F represents an optimal speed to be solved, E represents a unit matrix, $P_i^+$ represents a matrix with a positive eigenvalue after decomposition of an $i^{th}$ quadratic matrix $P_i$, $P_i^-$ represents a matrix with a negative eigenvalue after decomposition of the $i^{th}$ quadratic matrix $P_i$, the matrix $P_i$ refers to specific embodiments, and $q_i$, b and c represent constant vectors.

A second technical solution used in the present invention is: a time optimal speed planning system based on constraint classification, which comprises:

a path curve module configured for reading path information and carrying out curve fitting to obtain a path curve;

a static constraint module configured for sampling the path curve, and considering static constraint to obtain a static upper bound value of a speed curve;

a dynamic constraint module configured for considering dynamic constraint, and combining the static upper bound value of the speed curve to construct a time optimal speed model;

a model transformation module configured for carrying out convex transformation on the time optimal speed model to obtain a convex model; and a solving module configured for solving the convex model based on a quadratic sequence planning method to obtain a final speed curve.

The method and the system of the present invention have the beneficial effects that: according to the present invention, the constraint types are classified to adapt to subsequent model transformation, and the original model is transformed into the convex model in combination with the model transformation, so that the problem that a solution of a non-convex model falls into local optimum is prevented, and the problem of excessive scaling is solved.

DETAILED DESCRIPTION

The present invention is further described hereinafter with reference to the drawings and the specific embodiments. The numbers of the steps in the following embodiments are only set for convenience of explanation, and the sequence of the steps is not restricted. The execution sequence of the steps in the embodiments may be adjusted adaptively according to the understanding of those skilled in the art.

Figure 1:
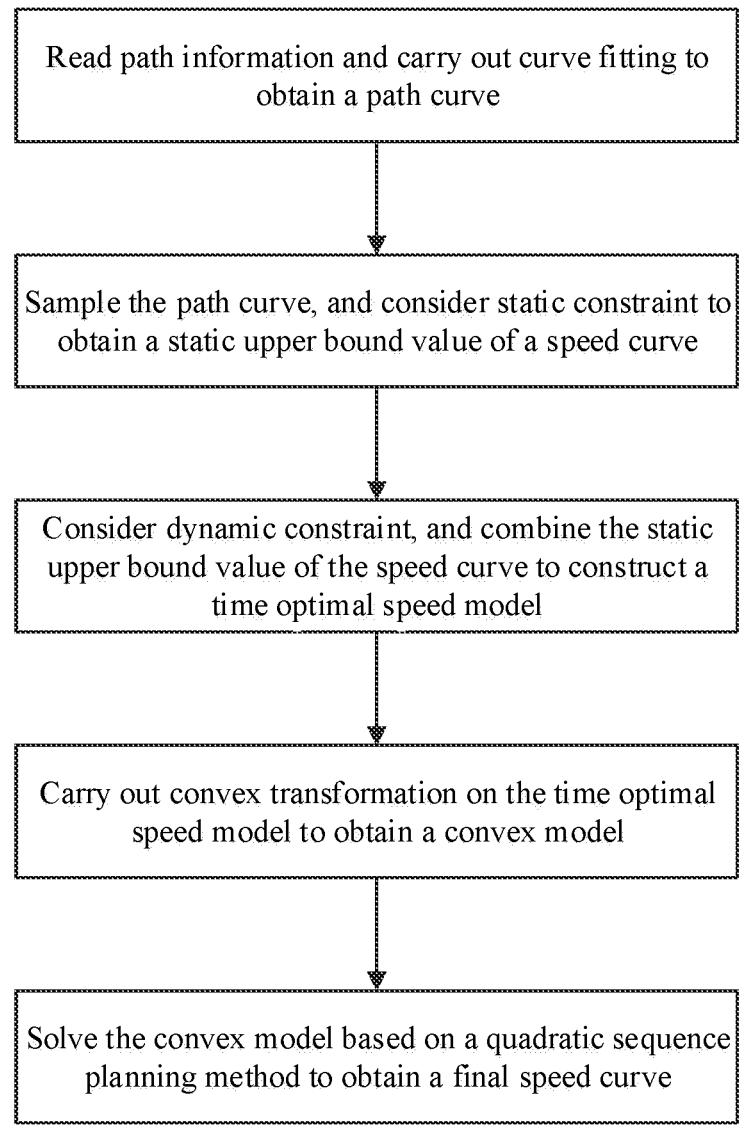
FIG. 1 is a flow chart of steps of a time optimal speed planning method based on constraint classification according to the present invention.

With reference to FIG. 1, the present invention provides a time optimal speed planning method based on constraint classification, and the method comprises the following steps.

In S1, path information is read and curve fitting is carried out to obtain a path curve.

In S1.1, path information $(x_1, y_1), (x_2, y_2), (x_3, y_3), \ldots, y_n)$ is read.

In S1.2, NURBS curve fitting is employed to obtain the path curve as follows:

$$C(u) = \frac{\sum_{i=0}^{n} N_{i,p}(u) w_i P_i}{\sum_{i=0}^{n} N_{i,p}(u) w_i}, \quad u_1 \leq u \leq u_{n+p+1},$$

wherein $C(u)$ represents the path curve, $P_i$ ($i=1, 2, \ldots, n$) represents a control point, $w_i$ represents a weight coefficient corresponding to the control point, $N_{i,p}$ represents an $i^{th}$ p-order function, u represents a spline parameter variable and $0 \leq u \leq 1$, and $N_{i,p}$ is a base function and calculated as follows:

$$N_{i,p}(u) = \begin{cases} 0, & u_i \leq u \leq u_{i+1} \\ 1, & \text{otherwise} \end{cases}$$

$$N_{i,p}(u) = \frac{u - u_i}{u_{i+p} - u_i} N_{i,p-1}(u) + \frac{u_{i+p+1} - u}{u_{i+p+1} - u_{i+1}} N_{i+1,p-1}(u).$$

Constraints are divided into static constraint and dynamic constraint in the present invention.

The static constraint is that:

a maximum feed speed $f_{t,max}$, a maximum axis speed $v_\wedge = [v_{x,max}, v_{y,max}, v_{z,max}, \ldots]^T$ and a maximum motor speed $v_\wedge = [v_{m1,max}, v_{m2,max}, v_{m3,max}, \ldots]^T$ determined by performances of a machine tool are a set of static constraints, which may be expressed as:

$f_{p,max} = \min\{f_{t,max}, K_1^-(v_{\wedge,max}), K_1^-(K_2^-(v_{\wedge,max}))\}$, wherein $K_n^-$ is inverse kinematics transformation.

A centripetal acceleration $f_{n,a}$ and a centripetal jerk constraint $f_{n,j}$, are as follows:

$$f_{n,a} = \sqrt{\rho a_{n,max}},$$
$$f_{n,j} = \sqrt{\rho^2 j_{n,max}},$$

wherein $a_{n,max}$ and $j_{n,max}$ represent a maximum centripetal acceleration and a maximum centripetal jerk, and $\rho$ represents a curvature of the path curve as follows:

$$\rho = \frac{\|C'(u)\|^3}{\|C'(u) \times C''(u)\|}.$$

A chord error constraint and a contour error constraint are as follows:

$$f_{chrd} = \frac{2}{T} \sqrt{\rho^2 - (\rho - \delta_{max})^2}$$

$$f_{cntr} = \rho \omega_n \sqrt{1 - 2\xi^2 + \sqrt{(2\xi^2 - 1)^2 - \frac{\varepsilon_{max}^2 - 2\varepsilon_{max}\rho}{(\rho - \varepsilon_{max})^2}}},$$

wherein $\delta_{max}$ represents a maximum chord error, $\varepsilon_{max}$ represents a maximum contour error, and $\omega_n$ and $\xi$ respectively represent inherent frequency and damping of a numerical control system.

Therefore, a maximum feed speed satisfying the static constraint is as follows:

$f_{sta,max} = \min\{f_{p,max}, f_{n,a}, f_{n,j}, f_{chrd}, f_{cntr}\}$.

The dynamic constraint is that:

a form of feed speed constraint satisfying tangential kinematics constraint is as follows:

$$\begin{cases} |F(s)| = |\dot{L}(s)| \leq f_{t,max} \\ |A(s)| = \ddot{L}(s) \leq a_{t,max} \\ |J(s)| = |\dddot{L}(s)| \leq j_{t,max} \end{cases}$$

wherein s represents an arc length of the path C(u), which may be calculated by a Simpson's integral method, L(s) is a length function of a feed path along the path C(u), $\dot{L}(s)$, $\ddot{L}(s)$ and $\dddot{L}(s)$ are respectively first-order, second-order and third-order derivatives of the L(s) in a time domain t, and $f_{t,max}$, $a_{t,max}$ and $j_{t,max}$ respectively represent a maximum feed speed, a maximum tangential acceleration and a maximum tangential jerk allowed by the machine tool.

There is an inverse kinematics relationship between a tangential motion of a terminal of the numerical control system and a motion of each axis, and similarly, a kinematics constraint of a single axis is as follows:

$$\begin{cases} |V_\wedge(s)| = |\dot{M}(s)| = |M'F| \leq v_{\wedge,max} \\ |A_\wedge(s)| = |\ddot{M}(s)| = |M''F^2 + M'A_t| \leq a_{\wedge,max} \\ |J_\wedge(s)| = |\dddot{M}(s)| = |M'''F^3 + 3M''A_tF + M'J_t| \leq j_{\wedge,max} \end{cases},$$

wherein $\wedge = x, y, z, \theta_x, \theta_y, \theta_z$, M(s) represents a displacement function of each axis, "·" represents derivation of time t, "'" represents derivation of parameter s, and $v_{\wedge,max}$, $a_{\wedge,max}$ and $j_{\wedge,max}$ represent maximum motion parameters allowed by each axis.

It can be known from the constraint analysis above that a maximum feed speed satisfying the dynamic constraint is as follows:

$$f_{dyn,max} = \min\{T_{t,a}(\alpha_{t,max}), T_{t,j}(j_{t,max}), T_{\wedge,a}(\alpha_{\wedge,max}), T_{\wedge,j}(j_{\wedge,max})\},$$

then under all constraints, a maximum feed speed value is as follows:

$$F = \min\{f_{sta,max}, f_{dyn,max}\}.$$

In S2, the path curve is sampled, and the static constraint is considered to obtain a static upper bound value of a speed curve.

Specifically, in order to realize rapid solution, we first consider the static constraint to obtain the static upper bound of the speed curve, and then consider the dynamic constraint. When the path curve is sampled, taking 1000 sampling points as an example, the static upper bound value of the feed speed curve is calculated by scanning a whole path at isoparametric intervals [0, Δu, 2Δu, ..., (n−2)Δu, 1] as follows:

$$F_{up} = [f_{sta,max,1}, f_{sta,max,2}, \ldots, f_{sta,max,n}]^T.$$

In S3, the dynamic constraint is considered, and the static upper bound value of the speed curve is combined to construct a time optimal speed model.

In S3.1, the static upper bound value of the speed curve is substituted into a dynamic constraint equation set point by point, and an initial model is constructed with time optimum as the objective function.

Specifically, 1,000 static upper bound values of speed are substituted into two dynamic constraint equation sets point by point, with a total of 8,000 constraint conditions, and the following model is constructed with time optimum as the objective function as follows:

$$\min_{v_\wedge} T = \int_{t_0}^{t_f} 1 dt$$

$$F = [f_1, f_2, \ldots, f_n]^T$$

-continued $$\text{s.t.} \begin{cases} |A_i(s)| = |k_{1,i}f_i^2 - k_{1,i}f_if_{i-1}| \leq a_{t,max} \\ |J_i(s)| = |2k_{1,i}^2 f_i^3 + k_{2,i}f_i^2 f_{i-2} + k_{1,i}^2 f_if_{i-1}^2 - k_{3,i}f_i^2 f_{i-1}| \leq j_{t,max} \\ |A_{\wedge,i}(s)| = |(k_{1,i}M_i' + M_i'')f_i^2 - k_{1,i}M_i'f_if_{i-1}| \leq a_{\wedge,max} \\ |J_{\wedge,i}(s)| = \begin{vmatrix} k_{1,i}^2 M_i'f_if_{i-1}^2 - (3k_{1,i}M_i'' + k_{3,i}M_i')f_i^2 f_{i-1} + \\ (M_i''' + 3k_{1,i}M_i'' + 2k_{1,i}^2 M_i')f_i^3 + k_{2,i}M_i'f_i^2 f_{i-2} \end{vmatrix} \leq j_{\wedge,max} \\ f_1 = 0, f_2 = 10, f_{n-1} = 10, f_n = 0 \end{cases}$$

$$i = 3, 4, \ldots, n-2,$$

wherein $$k_{1,i} = \frac{1}{s_i - s_{i-1}}, k_{2,i} = \frac{K_{1,i}}{s_{i-1} - s_{i-2}}, k_{3,i} = 3K_{1,i}^2 + K_{2,i}.$$

In S3.2, the initial model is transformed according to the feed speed and the static upper bound value to obtain the time optimal speed model.

Specifically, $F_{up}$ represents an upper bound of a speed at each point on the path, and although some points at the speed fail to satisfy single axis kinematics constraint, since $t_{min} = s/F_{up}$, a machining time along the path is shorter when an actual feed speed value is closer to $F_{up}$. Therefore, the time optimal objective function may be expressed by a minimum difference sum of the feed speed F and the $F_{up}$. Since the feed speed is $F \in [0, F_{up}]$, the time optimal speed model may be expressed as follows:

$$\min O = \sum_{i=1}^{n} (f_{up,i} - F_i)$$

$$\text{s.t.} \begin{cases} |A_i(s)| \leq a_{t,max} \\ |J_i(s)| \leq j_{t,max} \\ |A_{\wedge,i}(s)| \leq a_{\wedge,max} \\ |J_{\wedge,i}(s)| \leq j_{\wedge,max} \\ f_1 = 0, f_2 = 10, f_{n-1} = 10, f_n = 0 \end{cases}$$

$$i = 3, 4, \ldots, n-2,$$

wherein $f_{up,i}$ represents a maximum speed value at an $i^{th}$ sampling point, $F_i$ represents an optimal speed value at the $i^{th}$ sampling point, $A_i(s)$ and $J_i(s)$ represent an acceleration and a jerk at the $i^{th}$ sampling point in a feed direction, $A_{\wedge,i}(s)$ and $J_{\wedge,i}(s)$ represent an acceleration and a jerk at the $i^{th}$ sampling point in a $\wedge$ axis direction, $a_{t,max}$ and $j_{t,max}$ respectively represent a maximum acceleration and a maximum jerk in a tangent direction, and $a_{\wedge,max}$ and $j_{\wedge,max}$ represent a maximum acceleration and a maximum jerk in the $\wedge$ axis direction.

In S4, convex transformation is carried out on the time optimal speed model to obtain a convex model.

Specifically, the time optimal speed model above is a nonlinear nonconvex model. During solution, solution of a nonconvex problem often falls into a dilemma of local optimum on the one hand, and when there are too many sampling points, a solution space dimension is too large and a solving efficiency is slow on the other hand. Aiming at the two problems, the nonconvex problem is simplified into a convex problem.

In S4.1, an objective function of the time optimal speed model is transformed into a matrix form to obtain an objective function of the matrix form.

Specifically, the objective function is transformed as follows:

$$\min O = \sum_{i=1}^{n}(f_{up,i} - f_i)^2, i = 3, 4, \ldots, n.$$

The transformed matrix form is as follows:

$\min O = F^T E F - F_{up}^T F_{up}$.

In S4.2, a constraint condition is transformed into a matrix form through matrix decomposition and a preset scaling function to obtain a constraint condition of the matrix form.

The transformation of the constraint condition is that:

the constraint condition is observed, and a general form of the constraint condition is found as follows:

$\text{cons} = \alpha_{11}f_{i-2}^2 + \alpha_{22}f_{i-1}^2 + \alpha_{33}f_i^2 + \alpha_{12}f_{i-2}f_{i-1}$ $+\alpha_{13}f_{i-2}f_{i-1} + \alpha_{23}f_{i-2}f_{i-1} + b_1 f_{i-2} + b_2 f_{i-1} + b_3 f_i + c.$ The transformed matrix form is as follows:

$$\text{cons} = \frac{1}{2} F^T P_i F + q_i^T F + c, i = 3, 4, \ldots, n,$$

wherein $$P_i = \begin{pmatrix} O_{(i-2)\times(i-2)} & & \\ & \hat{P}_i & \\ & & O_{(n-i)\times(n-i)} \end{pmatrix}, \hat{P}_i = \begin{pmatrix} 2a_{11} & a_{22} & a_{13} \\ a_{12} & 2a_{22} & a_{23} \\ a_{13} & a_{23} & 2a_{33} \end{pmatrix},$$

and c is a constant.

Specifically, the matrix decomposition is that: an eigenvalue of a matrix is $\hat{P}_i$ is calculated, $\lambda_{min} < 0$ is set to be a minimum eigenvalue of the matrix $\hat{P}_i$, and then for any $\sigma > |\lambda_{min}|$, it has the following relationship:

$\hat{P}_i^+ = \hat{P}_i + \sigma E \leq 0, \hat{P}_i^- = \sigma E \leq 0.$

Therefore, $\hat{P}_i = \hat{P}_i^+ - \hat{P}_i^-.$

A scaling function is set to be $$\Upsilon(x) = \gamma^{\frac{1}{2}(1-sgn(x))} \cdot x,$$

wherein $\gamma \in [0,1]$ is a scaling coefficient, then there is a form as follows:

$$\text{cons}' = \frac{1}{2} F^T P_i^+ F - \frac{1}{2} F_{up}^T \Upsilon(P_i^-) F + q_i^T F + c \leq \text{cons}.$$

In S4.3, the convex model is obtained according to the objective function of the matrix form and the constraint condition of the matrix form as follows:

$$\min O = F^T E F - F_{up}^T F_{up}$$

$$s.t. \begin{cases} \frac{1}{2} F^T P_i^+ F + \frac{1}{2} F_{up}^T \Upsilon(P_i^-) F + q_i^T F + c \leq 0 \\ (E_1 + E_2 + E_{n-1} + E_n)F = b \end{cases}$$

$i = 3, 4, \ldots, n-2,$ wherein F represents an optimal speed to be solved, E represents a unit matrix, $P_i^+$ represents a matrix with a positive eigenvalue after decomposition of an $i^{th}$ quadratic matrix $P_i$, $P_i^-$ represents a matrix with a negative eigenvalue after decomposition of the $i^{th}$ quadratic matrix $P_i$, the matrix $P_i$ refers to specific embodiments, and $q_i$, b and c represent constant vectors.

In S5, the convex model is solved based on a quadratic sequence planning method to obtain a final speed curve.

Specifically, the quadratic sequence planning method is used for solution, inequality constraint is forcibly changed into equality constraint first, then the objective function and all equality constraints are constructed into an unconstrained Lagrange's equation, the Lagrange's equation is solved by using an extreme value condition of a multivariate function, and a result is solved by spline curve fitting to obtain the final speed curve.

Figure 2:
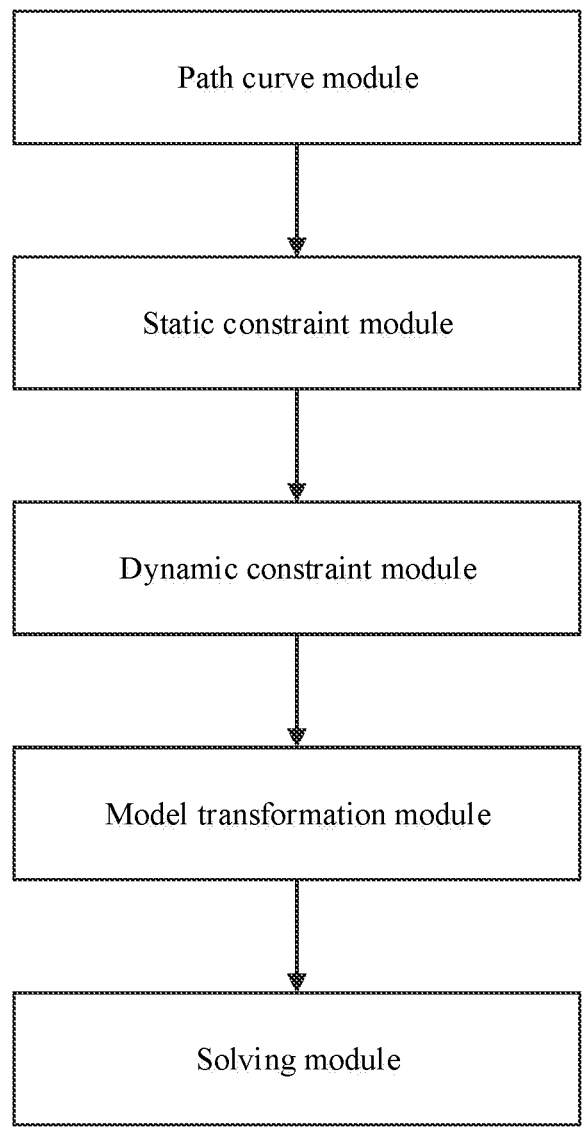
FIG. 2 is a structure block diagram of a time optimal speed planning system based on constraint classification according to the present invention.
Figure 3:
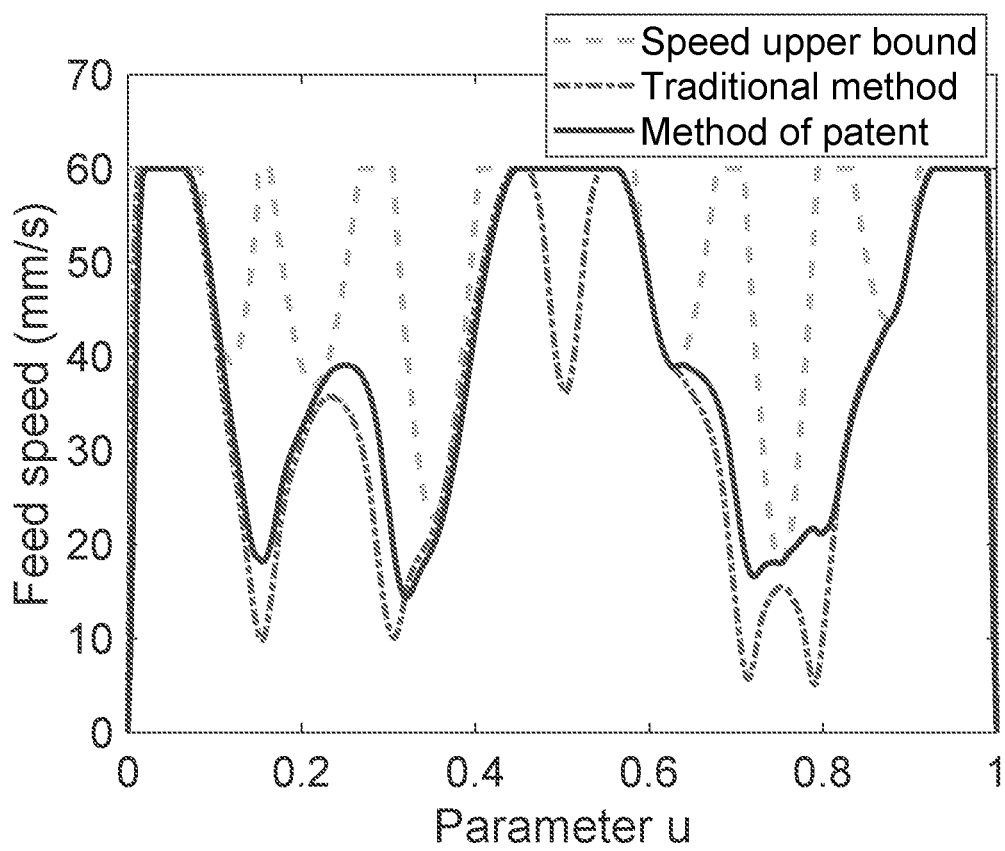
FIG. 3 shows feed speed curves planned by the method of the present invention and a traditional method.

As shown in FIG. 2, a time optimal speed planning system based on constraint classification comprises:

a path curve module configured for reading path information and carrying out curve fitting to obtain a path curve;

a static constraint module configured for sampling the path curve, and considering static constraint to obtain a static upper bound value of a speed curve;

a dynamic constraint module configured for considering dynamic constraint, and combining the static upper bound value of the speed curve to construct a time optimal speed model;

a model transformation module configured for carrying out convex transformation on the time optimal speed model to obtain a convex model; and a solving module configured for solving the convex model based on a quadratic sequence planning method to obtain a final speed curve.

All the contents in the above method embodiments are applicable to the system embodiments, the specific functions realized by the system embodiments are the same as those realized by the method embodiments above, and the beneficial effects achieved by the system embodiments are the same as those achieved by the method embodiments above.

The above describes the preferred embodiments of the present invention in detail, but the present invention is not limited to the embodiments. Those skilled in the art may further make various equivalent modifications or substitutions without violating the spirit of the present invention, and these equivalent modifications or substitutions are all included in the scope defined by the claims of the present application.

What is claimed is:

1. A time optimal speed planning method based on constraint classification, comprising the following steps of:

reading path information of a mechanical part and carrying out curve fitting to obtain a path curve;

sampling the path curve, and considering static constraint to obtain a static upper bound value of a speed curve;

considering dynamic constraint, and combining the static upper bound value of the speed curve to construct a time optimal speed model;

transforming an objective function of the time optimal speed model into a matrix form to obtain an objective function of the matrix form;

transforming a constraint condition into a matrix form through matrix decomposition and a preset scaling function to obtain a constraint condition of the matrix form, wherein the constraint condition of the matrix form is expressed as follows:

$$cons = \frac{1}{2}F^T P_i F + q_i^T F + c, i = 3, 4, \ldots, n;$$

obtaining a convex model according to the objective function of the matrix form and the constraint condition of the matrix form, wherein a formula of the convex model is expressed as follows:

$$\min O = F^T E F - F_{up}^T F_{up}$$

$$s.t. \begin{cases} \frac{1}{2}F^T P_i^+ F + \frac{1}{2}F_{up}^T \Upsilon(P_i^-)F + q_i^T F + c \le 0 \\ (E_1 + E_2 + E_{n-1} + E_n)F = b \end{cases}$$

$$i = 3, 4, \ldots, n-2;$$

wherein F represents an optimal speed to be solved, E represents a unit matrix, $P_i^+$ represents a matrix with a positive eigenvalue after decomposition of an $i^{th}$ quadratic matrix $P_i$, $P_i^-$ represents a matrix with a negative eigenvalue after decomposition of the $i^{th}$ quadratic matrix $P_i$, $q_i$, b and c represent constant vectors, $F_{up}$ represents an upper bound of a speed at each point on a path, $\Upsilon$ represents a scaling function, and $P_i$ represents the $i^{th}$ quadratic matrix; and solving the convex model based on a quadratic sequence planning method to obtain a final speed curve; and designing a processing path for the mechanical part based on the final speed curve.

2. The time optimal speed planning method based on constraint classification according to claim 1, wherein a formula of the curve fitting is expressed as follows:

$$C(u) = \frac{\sum_{k=0}^{n} N_{i,p}(u) w_i P_i}{\sum_{k=0}^{n} N_{i,p}(u) w_i}, u_1 \le u \le u_{n+p+1},$$

wherein C(u) represents the path curve, $P_i$ represents a control point, $w_i$ represents a weight coefficient corresponding to the control point, $N_{i,p}$ represents an $i^{th}$ p-order function, and u represents a spline parameter variable.

3. The time optimal speed planning method based on constraint classification according to claim 2, wherein the step of considering the dynamic constraint, and combining the static upper bound value of the speed curve to construct the time optimal speed model, specifically comprises:

substituting the static upper bound value of the speed curve into a dynamic constraint equation set point by point, and constructing an initial model with time optimum as the objective function; and transforming the initial model according to a feed speed and the static upper bound value to obtain the time optimal speed model.

4. The time optimal speed planning method based on constraint classification according to claim 3, wherein a formula of the time optimal speed model is expressed as follows:

$$\min O = \sum_{i=1}^{n}(f_{up,i} - F_i)$$

$$s.t. \begin{cases} |A_i(s)| \le a & t, \max \\ |J_i(s)| \le j & t, \max \\ |A_{\wedge,i}(s)| \le a_{\wedge,max} \\ |J_{\wedge,i}(s)| \le j_{\wedge,max} \\ f_1 = 0, f_2 = 10, f_{n-1} = 10, f_n = 0 \end{cases}$$

$$i = 3, 4, \ldots, n-2,$$

wherein $f_{up,i}$ represents a maximum speed value at an $i^{th}$ sampling point, $F_i$ represents an optimal speed value at the $i^{th}$ sampling point, $A_i(s)$ and $J_i(s)$ represent an acceleration and a jerk at the $i^{th}$ sampling point in a feed direction, $A_{\wedge,i}(s)$ and $J_{\wedge,i}(s)$ represent an acceleration and a jerk at the $i^{th}$ sampling point in a $\wedge$ axis direction, $a_{t,max}$ and $j_{t,max}$ respectively represent a maximum acceleration and a maximum jerk in the feed direction, and $a_{\wedge,max}$ and $j_{\wedge,max}$ represent a maximum acceleration and a maximum jerk in the $\wedge$ axis direction.

* * * * *